(12) United States Patent
Kim (10) Patent No.: US 12,545,221 B2
(45) Date of Patent: Feb. 10, 2026

(54) ELECTRONIC MECHANICAL BRAKE AND CONTROLLING METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 127 days.

(21) Appl. No.: 18/414,801

(22) Filed: Jan. 17, 2024

(65) Prior Publication Data

US 2024/0409073 A1 Dec. 12, 2024

(30) Foreign Application Priority Data

Jun. 8, 2023 (KR) .................. 10-2023-0073716

(51) Int. Cl.
*B60T 8/172* (2006.01)
*B60T 8/18* (2006.01)
(Continued)

(52) U.S. Cl.
CPC ............. *B60T 8/172* (2013.01); *B60T 8/18* (2013.01); *B60T 13/746* (2013.01); *B60T 7/042* (2013.01);
(Continued)

(58) Field of Classification Search
CPC ...... B60T 7/042; B60T 8/172; B60T 8/17616; B60T 8/18; B60T 13/746; B60T 2220/04;
(Continued)

(56) References Cited

U.S. PATENT DOCUMENTS

| 7,837,278 B2 * | 11/2010 | Nilsson | B60T 8/345 |
| | | | 188/158 |
| 2008/0054716 A1 * | 3/2008 | Sato | B60T 7/042 |
| | | | 701/70 |

FOREIGN PATENT DOCUMENTS

| DE | 19957632 A1 * | 5/2001 | G01P 3/488 |
| KR | 20140026034 A * | 3/2014 | B60T 13/74 |

OTHER PUBLICATIONS

Witte, DE 199 57 632, machine translation. (Year: 2001).*
Kim, KR 10-2014-0026034, machine translation. (Year: 2014).*

* cited by examiner

*Primary Examiner* — Mark L. Greene
(74) *Attorney, Agent, or Firm* — Morgan, Lewis & Bockius LLP (57) ABSTRACT

An electronic mechanical brake comprising: a pedal sensor for sensing a stepping force corresponding to a driver's intention to brake; a center controller for issuing a braking command corresponding to the stepping force and for securing braking redundancy based on a first controller and a second controller; a plurality of wheel controllers for receiving a braking command from the center controller and generating a braking force based on the received braking command using electronic mechanical brakes respectively disposed on a right front wheel, a left front wheel, a right rear wheel, and a left rear wheel; a plurality of wheel speed sensors respectively connected to the plurality of wheel controllers to measure the speed of the right front wheel, the left front wheel, the right rear wheel, and the left rear wheel; and a communications unit including a first communication line for transmitting and receiving signals between the center controller and the plurality of wheel controllers and a second communication line for securing communication redundancy with the first communication line, wherein the (Continued)

plurality of wheel controllers perform backup braking when an error occurs in either or both of the center controller and the communications unit.

10 Claims, 4 Drawing Sheets (51) Int. Cl.
*B60T 13/74* (2006.01)
*B60T 7/04* (2006.01)
*B60T 8/1761* (2006.01)

(52) U.S. Cl.
CPC ....... *B60T 8/17616* (2013.01); *B60T 2220/04* (2013.01); *B60T 2250/04* (2013.01); *B60T 2270/402* (2013.01); *B60T 2270/404* (2013.01); *B60T 2270/413* (2013.01); *B60T 2270/82* (2013.01)

(58) Field of Classification Search
CPC ........... B60T 2250/04; B60T 2270/402; B60T 2270/404; B60T 2270/413; B60T 2270/82
See application file for complete search history.

ELECTRONIC MECHANICAL BRAKE AND CONTROLLING METHOD THEREFOR

CROSS-REFERENCE TO RELATED APPLICATION

The present application claims the benefit under 35 USC § 119 (a) of Patent Application No. 10-2023-0073716, filed on Jun. 8, 2023, in Korea, the entire disclosure of which is incorporated herein by reference for all purposes.

TECHNICAL FIELD

The present disclosure relates to an electronic mechanical brake and a method of controlling the same.

BACKGROUND

The content described in this section is simply about background information on the present disclosure and does not make up prior art.

The electronic mechanical brake system senses a driver's intention to brake based on the brake by wire (BBW) system. The electronic mechanical brake system calculates a required braking force based on the driver's sensed intention to brake by using an electronic control unit, and generates a braking force corresponding to the required braking force by using an actuator.

The center controller of the electronic mechanical brake system determines all braking commands of a combined braking system (CBS), an anti-lock braking system (ABS), an electronic stability control (ESC), etc. The center controller transmits a braking command to a wheel controller mounted on an electronic mechanical brake actuator to generate a braking force for an electronic mechanical brake. Here, communication between the center controller and the wheel controller is operated based on CAN communication.

The electronic mechanical brake system is not capable of performing backup braking based on a hydraulic braking force. Therefore, the electronic mechanical brake system is designed to fulfill the function of electrical redundancy. In order to perform the function of redundancy, the center controller is formed with redundancy, and the CAN communication between the center controller and the wheel controller is built with redundancy. In the case of a conventional electronic mechanical brake system, there is a problem in that emergency braking of a vehicle is impossible when an error occurs in both center controllers for the function of redundancy or in both CAN communications for the function of redundancy.

SUMMARY

In the case of the electronic mechanical brake and the method of controlling the same according to an embodiment of the present disclosure, it may be possible to generate an emergency braking force even when a problem occurs in both first and second controllers or in both first and second communication lines.

In the case of the electronic mechanical brake and the method of controlling the same according to an embodiment of the present disclosure, it may be possible to improve the reliability and the stability of the electronic mechanical brake.

The problems to be addressed by the present disclosure are not limited to the above-mentioned problems, and the following description will allow a person having ordinary skill in the art to clearly understand other problems not mentioned above.

In the case of the electronic mechanical brake and the method of controlling the same according to an embodiment of the present disclosure, it may be possible to generate an emergency braking force even when a problem occurs in both first and second controllers or in both first and second communication lines.

In the case of the electronic mechanical brake and the method of controlling the same according to an embodiment of the present disclosure, it may be possible to improve the reliability and the stability of the electronic mechanical brake.

DETAILED DESCRIPTION

Figure 1:
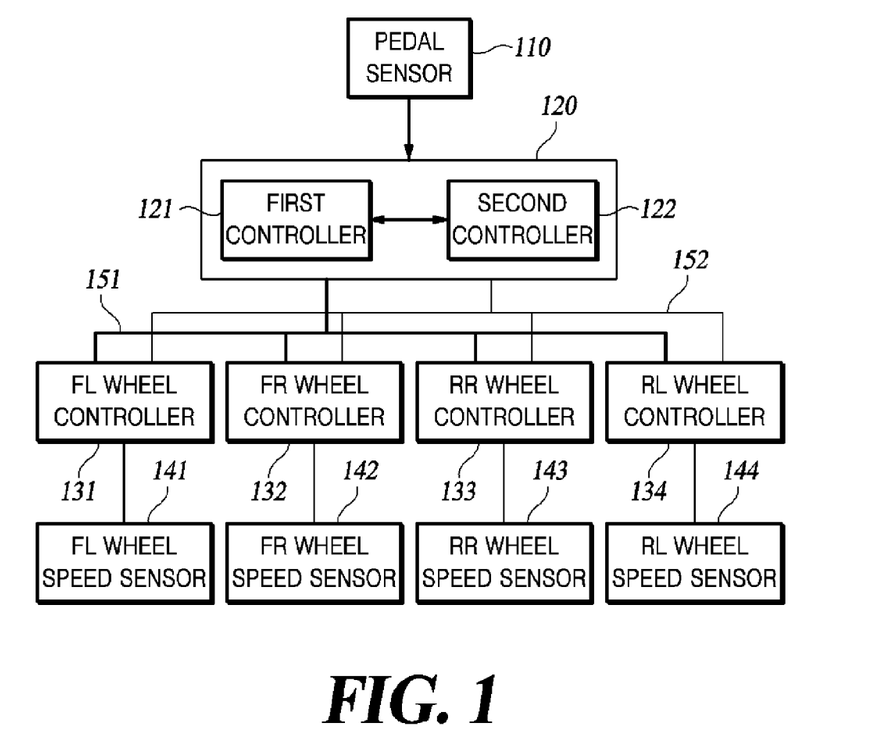
FIG. 1 is a block diagram showing an example of components of an electronic mechanical brake.

FIG. 1 is a block diagram showing an example of components of an electronic mechanical brake.

In some implementations, Referring to FIG. 1, a braking apparatus with the electronic mechanical brake may include a pedal sensor 110, a center controller 120, wheel controllers 131, 132, 133, and 134, and wheel speed sensors 141, 142, 143, and 144, and a communications unit 151 and 152.

An electronic mechanical brake for controlling braking of a vehicle may be applied to each of front (FL, FR) and rear wheels (RL, RR) mounted on a vehicle. Here, unlike hydraulic brakes, the electronic mechanical brake may be based on a mechanical mechanism driven by an electric motor. Specifically, the electronic mechanical brake may include brakes that obtain a braking force by pressing a friction pad based on a driving force of an electric motor.

The pedal sensor 110 may sense a stepping force corresponding to a driver's intention to brake. The pedal sensor 110 may generate a pedal signal. Here, the pedal signal may be a braking request signal generated by a driver applying a pedal force to a pedal.

The center controller 120 may include a duplex controller. For control redundancy, the center controller 120 may include a first controller 121 and a second controller 122. The first controller 121 and the second controller 122 may receive pedal signals from the pedal sensor 110. The first controller 121 and the second controller 122 may issue a braking command required for a vehicle based on a pedal signal. The first controller 121 and the second controller 122 may transmit a braking command to the wheel controllers 131, 132, 133, and 134 disposed on the electronic mechanical brake. Here, the braking command may be a braking signal issued to generate a braking force corresponding to a braking demand value requested by the pedal sensor 110.

The wheel controllers 131, 132, 133, and 134 may generate a braking force for a vehicle using the electronic mechanical brake disposed on each wheel (FR, FL, RR, and RL). The wheel controllers 131, 132, 133, and 134 may include a FL wheel controller 131, a FR wheel controller 132, a RR wheel controller 133, and a RL wheel controller 134. The wheel controllers 131, 132, 133, and 134 may independently generate braking commands even when do not receiving a braking command from the center controller 120. Therefore, when determining that an abnormality has occurred in both the first controller 121 and the second controller 122, the wheel controllers 131, 132, 133, and 134 may issue a braking command required for backup braking of a vehicle.

The wheel speed sensors 141, 142, 143, and 144 may measure the speed of wheels FR, FL, RR, and RL. The wheel speed sensors 141, 142, 143, and 144 may be placed in areas adjacent to the wheels. The wheel speed sensors 141, 142, 143, and 144 may be connected to a FL wheel speed controller 131, a FR wheel speed controller 132, a RR wheel speed controller 133, and a RL wheel speed controller 134, respectively. The wheel speed sensors 141, 142, 143, and 144 may include a FL wheel speed sensor 141, a FR wheel speed sensor 142, a RR wheel speed sensor 143, and a RL wheel speed sensor 144.

The communications unit 151 and 152 according to an embodiment of the present disclosure may be operated based on an in-vehicle communication method including controller area network (CAN) communication. The communications unit 151 and 152 may transmit and receive signals between the center controller 120 and the wheel controllers 131, 132, 133, and 134. Here, the signals may include braking signals, feedback signals, etc.

The communications unit 151 and 152 may be redundant for communication redundancy. The communications unit 151 and 152 may include a first communication line 151 and a second communication line 152. The first communication line 151 and the second communication line 152 may be wired between the center controller 120 and the wheel controllers 131, 132, 133, and 134. The center controller 120 and the wheel controllers 131, 132, 133, and 134 may be connected to each other with redundancy by the first communication line 151 and the second communication line 152. For example, when an error occurs in the first communication line 151, the center controller 120 and the wheel controllers 131, 132, 133, and 134 may transmit and receive signals such as a braking command or a feedback signal using the second communication line 152.

The center controller 120 may transmit a braking command and a feedback signal to the wheel controllers 131, 132, 133, and 134 using either the first communication line 151 or the second communication line 152. For example, when it is determined that the wheel controllers 131, 132, 133, and 134 have not received a braking command or a feedback signal from the center controller 120, it may be determined that the center controller 120 has failed or that both the first communication line 151 and the second communication line 152 have failed. In describing the present disclosure, "failing" means that a malfunction occurs in a unit and the function of the unit is lost and/or disabled.

Figure 2:
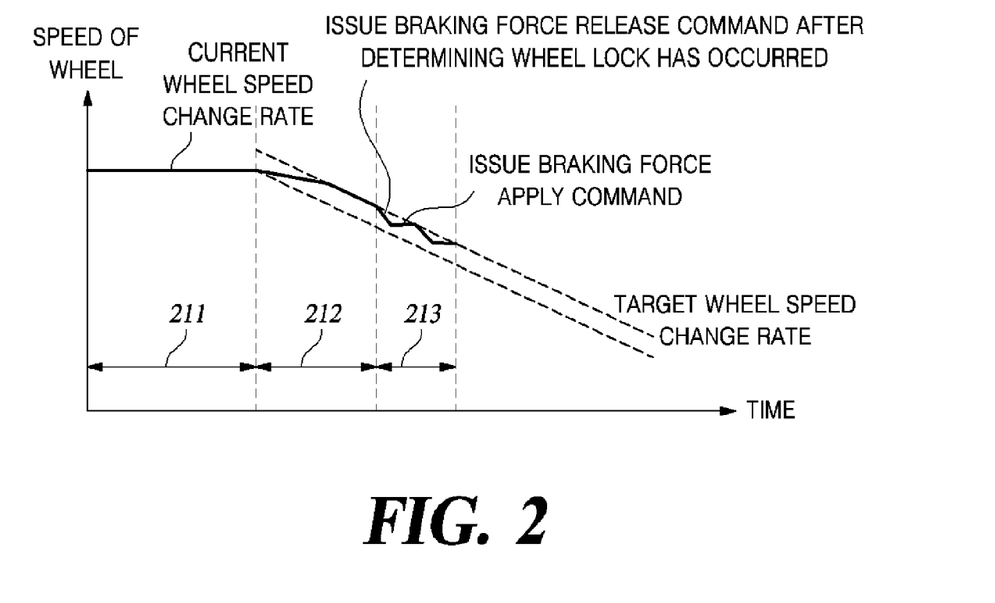
FIG. 2 is a graph showing an example of how a current wheel speed change rate varies depending on a target wheel speed change rate of the electronic mechanical brake.

FIG. 2 is a graph showing an example of how a current wheel speed change rate varies depending on a target wheel speed change rate of the electronic mechanical brake.

Referring to FIGS. 1 and 2, a first section 211 may be a section where a current wheel speed change rate of a vehicle is constant.

A second section 212 may be a section where the current wheel speed change rate based on the vehicle's braking force converges to a target wheel speed change rate.

A third section 213 may be a section where the wheel controllers 131, 132, 133, and 134 generate a braking force release command after determining that a wheel lock has occurred. The wheel controllers 131, 132, 133, and 134 may receive the generated braking force release command and brake a vehicle using the electronic mechanical brake based on a braking force corresponding to the received braking force release command. In the third section 213, when determining that a vehicle has an insufficient braking force, the wheel controllers 131, 132, 133, and 134 may issue a braking force apply command.

When determining that an error has occurred in the center controller 120 or in the communications unit 151 and 152, the wheel controllers 131, 132, 133, and 134 may issue a braking command necessary for emergency braking of a vehicle. For example, when it is determined that the wheel controllers 131, 132, 133, and 134 cannot receive a braking command from the center controller 120 or have not received a feedback signal from the center controller 120, it may be determined that both the first controller 121 and the second controller 122 have failed or that both the first communication line 151 and the second communication line 152 have failed.

When determining that an error has occurred in both the first controller 121 and the second controller 122 or that an error has occurred in both the first communication line 151 and the second communication line 152, the wheel controllers 131, 132, 133, and 134 may perform emergency braking on a vehicle based on a braking force based on a first braking command. Here, the first braking command may refer to a braking command for generating a braking force on the electronic mechanical brake so that the vehicle brakes by a preset deceleration speed. The preset deceleration speed according to the first braking command may indicate the speed change rate of the vehicle.

Even when the wheel controllers 131, 132, 133, and 134 may generate a braking force based on the first braking command, wheel slip may occur on the wheels of a vehicle when the vehicle is driven on a low friction road such as a rainy, snowy, or icy road. The wheel controllers 131, 132, 133, and 134 may share information on the speed of each wheel using the first communication line 151 and the second communication line 152. The wheel controllers 131, 132, 133, and 134 may estimate the speed of a vehicle based on the measured speed of each wheel. The wheel controllers 131, 132, 133, and 134 may control wheel slip based on the estimated speed of the vehicle.

When it is determined that an error has occurred in both the first communication line 151 and the second communication line 152, the wheel controllers 131, 132, 133, and 134 may determine whether wheel slip has occurred on a vehicle based on the first braking command, a first deceleration value, and a second deceleration value. The first deceleration value may refer to a deceleration value of a vehicle whose weight is a gross vehicle weight. The second deceleration value may refer to a deceleration value of a vehicle whose weight is a curb vehicle weight. The wheel controllers 131, 132, 133, and 134 may store information about the first and second deceleration values. For example, when a braking value generated by the front wheels of a vehicle is 3 kN and a braking value generated by the rear wheels is 1 kN, the first deceleration value of a vehicle whose load is a gross vehicle weight may be, for example, 0.3 g, and the second deceleration value of a vehicle whose load is a curb vehicle weight may be, for example, 0.4 g. Here, the wheel controllers 131, 132, 133, and 134 may calculate the target wheel speed change rate of a vehicle based on the first deceleration value that is lower than the second deceleration value. This is only one embodiment of the present disclosure, and according to another embodiment of the present disclosure, the first deceleration value may be greater than the second deceleration value based on the type of a vehicle, the driving condition of the vehicle, etc. Here, the curb vehicle weight refers to the weight of a vehicle measured when there is no passengers and luggage in the vehicle. The gross vehicle weight refers to the weight of a vehicle including passengers and the maximum load.

The wheel controllers 131, 132, 133, and 134 may issue a braking force release command or a braking force apply command based on the current wheel speed change rate of a vehicle so that the current wheel speed change rate of the vehicle remains within a critical range of the target wheel speed change rate. The wheel controllers 131, 132, 133, and 134 may determine whether the current wheel speed change rate of a vehicle has exceeded the target wheel speed change rate. Here, determining whether the current wheel speed change rate has exceeded the target wheel speed change rate may mean determining whether the slope of the curve of the current wheel speed change rate is steeper than the slope of the curve of the target wheel speed change rate. The wheel controllers 131, 132, 133, and 134 may determine whether a current wheel speed change rate is lower than or equal to a target wheel speed change rate. Here, determining whether the current wheel speed change rate is lower than or equal to the target wheel speed change rate may mean determining whether the slope of the curve of the current wheel speed change rate is the same as or gentler than the slope of the curve of the target wheel speed change rate.

When determining that a current wheel speed change rate has exceeded a target wheel speed change rate, the wheel controllers 131, 132, 133, and 134 may determine that wheel slip has occurred and transmit a braking force release command to the electronic mechanical brake. When determining that a current wheel speed change rate is lower than or equal to a target wheel speed change rate, the wheel controllers 131, 132, 133, and 134 may determine that a braking force is insufficient and transmit a braking force apply command to the electronic mechanical brake.

Figure 3:
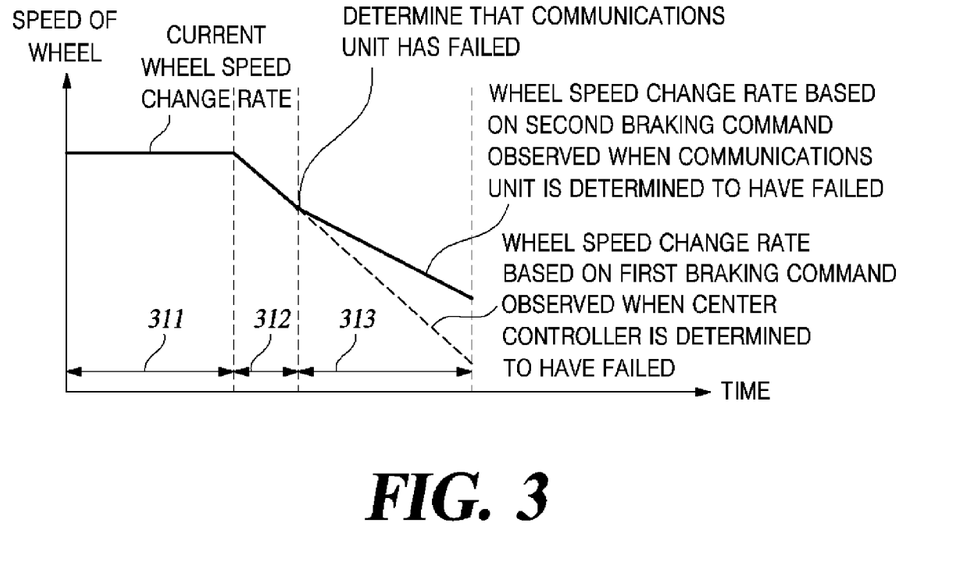
FIG. 3 is a graph showing an example of a wheel speed change rate based on a second braking command according to an embodiment of the present disclosure.

FIG. 3 is a graph showing an example of a wheel speed change rate based on a second braking command according to an embodiment of the present disclosure.

Referring to FIGS. 1 to 3, a fourth section 311 may be a section where a current wheel speed change rate of a vehicle is constant. A fifth section 312 may be a section of a wheel speed change rate observed when the wheel controllers 131, 132, 133, and 134 drive based on a braking force based on a first braking command after the center controller 120 is determined to have failed. A sixth section 313 may be a section of a wheel speed change rate observed when the wheel controllers 131, 132, 133, and 134 drive based on a second braking command after the communications unit 151 and 152 is determined to have failed.

When a vehicle drives on a low-friction road such as a rainy, snowy, or icy road, wheel slip may occur on either left wheels (FL and RL) or right wheels (FR and RR). When wheel slip only occurs on either the left wheels (FL and RL) or the right wheels of the vehicle as described above, a yaw moment may occur in the vehicle, which may reduce braking stability of the vehicle. The wheel controllers 131, 132, 133, and 134 may generate a braking force based on a second braking command to reduce a difference in a braking force between left wheels (FL, RL) and right wheels (FR, RR) of a vehicle. Here, the second braking command may be a braking command for braking a vehicle based on a braking force weaker than the braking force based on the above-described first braking command. For example, when the braking force based on the first braking command is 0.3 g with the center controller 120 determined to have filed, the braking force based on the second braking command may be 0.2 g with the communications unit 151 and 152 determined to have filed. The braking force based on the second braking command may be a braking force for preventing one-side braking of a vehicle that occurs when wheel slip occurs on the left wheels (FL, RL) or the right wheels (FR, RR) of the vehicle.

Figure 4:
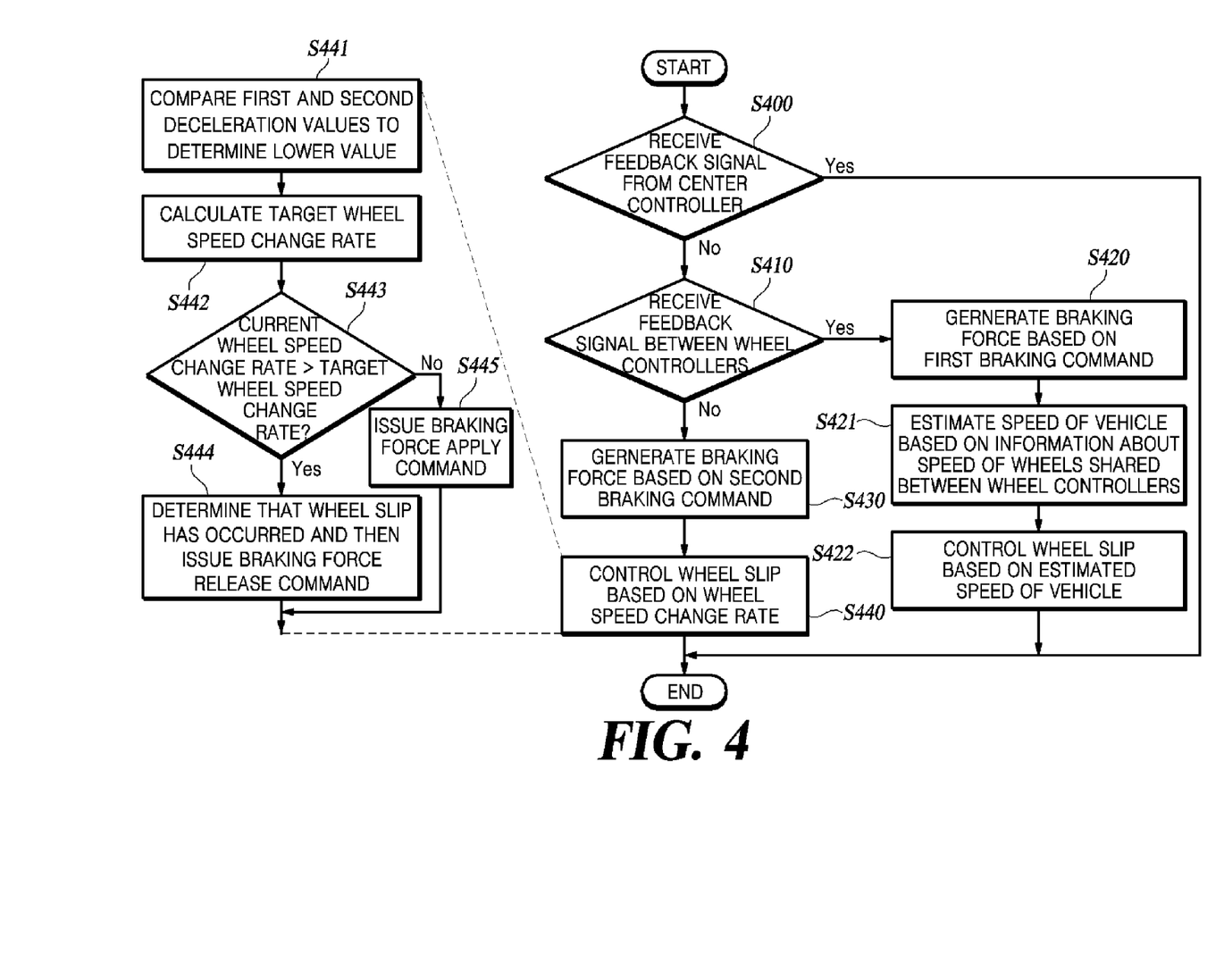
FIG. 4 is a flowchart showing an example of a method of controlling the electronic mechanical brake.

FIG. 4 is a flowchart showing an example of a method of controlling the electronic mechanical brake.

Referring to FIG. 4, it may be determined whether the wheel controllers 131, 132, 133, and 134 have received a feedback signal from the center controller 120 at S400. The wheel controllers 131, 132, 133, and 134 may receive a feedback signal from the center controller 120 using either or both of the first communication line 151 and the second communication line 152.

At S400, when it is not determined that the wheel controllers 131, 132, 133, and 134 have received a feedback signal from the center controller 120, it may be determined whether a feedback signal between the wheel controllers 131, 132, 133, and 134 has been received at S410. When the wheel controllers 131, 132, 133, and 134 have not received a feedback signal from the center controller 120, it may be determined that a problem has occurred in the center controller 120 or in the communications unit 151 and 152.

At S410, when it is determined that a feedback signal between the wheel controllers 131, 132, 133, and 134 has been received, a braking force based on the first braking command may be generated at S420. When it is determined that a feedback signal between the wheel controllers 131, 132, 133, and 134 has been received, the wheel controllers 131, 132, 133, and 134 may determine that an error has occurred in the center controller 120. The wheel controllers 131, 132, 133, and 134 may determine whether an error has occurred in the communications unit 151 and 152 by transmitting and receiving their respective feedback signals therebetween.

The wheel controllers 131, 132, 133, and 134 may share information about the speed of wheels to estimate the speed of the vehicle at S421. The wheel controllers 131, 132, 133, and 134 may measure the speed of each wheel using the wheel speed sensors 141, 142, 143, and 144.

The wheel controllers 131, 132, 133, and 134 may control wheel slip based on the estimated speed of the vehicle at S422.

At S410, when it is not determined that a feedback signal between the wheel controllers 131, 132, 133, and 134 has been received, a braking force based on the second braking command may be generated at S430. When it is not determined that a feedback signal between the wheel controllers 131, 132, 133, and 134 has been received, the wheel controllers 131, 132, 133, and 134 may determine that an error has occurred in the communications unit 151 and 152. After determining that an error has occurred in the communications unit 151 and 152, the wheel controllers 131, 132, 133, and 134 may generate a braking force based on the second braking command.

The wheel controllers 131, 132, 133, and 134 may control wheel slip based on a wheel speed change rate at S440.

To describe S440 in detail, first and second deceleration values may be compared to determine a lower value at S441. The first deceleration value refers to a deceleration value of a vehicle whose weight is a gross vehicle weight. The second deceleration value refers to a deceleration value of a vehicle whose weight is a curb vehicle weight.

A target wheel speed change rate may be calculated based on a lower value of the first deceleration value and the second deceleration value at S442. The first deceleration value and the second deceleration value may vary depending on the type of a vehicle, etc.

It may be determined whether a current wheel speed change rate based on the driving condition of a vehicle exceeds a target wheel speed change rate at S443. The wheel controllers 131, 132, 133, and 134 may monitor the current wheel speed change rate based on information about the speed of wheels received from the wheel speed sensors 141, 142, 143, and 144.

When determining that the current wheel speed change rate has exceeded the target wheel speed change rate at S443, the wheel controllers 131, 132, 133, and 134 may determine that wheel slip has occurred in the vehicle and then issue a braking force release command at S444.

When not determining that the current wheel speed change rate has exceeded the target wheel speed change rate at S443, the wheel controllers 131, 132, 133, and 134 may determine that the vehicle lacks a braking force and then issue a braking force apply command at S445.

What is claimed is:

1. An electronic mechanical brake comprising:
   a pedal sensor for sensing a stepping force corresponding to a driver's intention to brake;
   a center controller for issuing a braking command corresponding to the stepping force and for securing braking redundancy based on a first controller and a second controller;
   a plurality of wheel controllers for receiving a braking command from the center controller and generating a braking force based on the received braking command using electronic mechanical brakes respectively disposed on a right front wheel, a left front wheel, a right rear wheel, and a left rear wheel;
   a plurality of wheel speed sensors respectively connected to the plurality of wheel controllers to measure a speed of the right front wheel, the left front wheel, the right rear wheel, and the left rear wheel; and
   a communications unit including a first communication line for transmitting and receiving signals between the center controller and the plurality of wheel controllers and a second communication line for securing communication redundancy with the first communication line,
   wherein the plurality of wheel controllers perform backup braking when an error occurs in either or both of the center controller and the communications unit,
   wherein the plurality of wheel controllers determine whether the braking command or a feedback signal has been received from the first controller and/or the second controller,
   wherein, when the plurality of wheel controllers are not determining that the braking command or the feedback signal has been received from the first controller and/or the second controller, the plurality of wheel controllers determine that an error has occurred in both the first controller and the second controller.

2. The electronic mechanical brake of claim 1,
   wherein the plurality of wheel controllers generate a braking force based on a first braking command when determining that an error has occurred in both the first controller and the second controller, and determine whether wheel slip has occurred by estimating a speed of a vehicle based on the speed of each wheel measured by the wheel speed sensors.

3. The electronic mechanical brake of claim 1,
   wherein the plurality of wheel controllers are configured to transmit and receive respective feedback signals from each other when it is not determined that they have received the braking command and the feedback signal from the center controller, and determine that an error has occurred in both the first communication line and the second communication line when the respective feedback signals between the plurality of wheel controllers are not received.

4. The electronic mechanical brake of claim 3,
   wherein the plurality of wheel controllers generate a braking force based on a second braking command when determining that an error has occurred in both the first communication line and the second communication line, determine whether a current wheel speed change rate has exceeded a target wheel speed change rate based on the second braking command, and determine that wheel slip has occurred in a vehicle when determining that the current wheel speed change rate has exceeded the target wheel speed change rate based on the second braking command.

5. The electronic mechanical brake of claim 4,
   wherein the target wheel speed change rate is a wheel speed change rate of a lower value of a first deceleration value of the vehicle whose weight is a maximum weight and a second deceleration value of the vehicle whose weight is a curb vehicle weight.

6. The electronic mechanical brake of claim 5,
   wherein the plurality of wheel controllers issue a braking force release command when the current wheel speed change rate based on a current driving condition of the vehicle exceeds the target wheel speed change rate based on the second braking command.

7. The electronic mechanical brake of claim 5,
   wherein the plurality of wheel controllers issue a braking force apply command when the current wheel speed change rate is lower than or equal to the target wheel speed change rate.

8. A method of controlling an electronic mechanical brake, comprising:
   determining whether a plurality of wheel controllers have received a braking command and a feedback signal from a center controller;
   determining whether the plurality of wheel controllers have received respective feedback signals from each other when it is not determined that they have received the braking command and the feedback signal from the center controller;
   generating a braking force based on a first braking command when it is determined that the plurality of wheel controllers have received the respective feedback signals from each other;
   and generating a braking force based on a second braking command when it is not determined that the plurality of wheel controllers have received the respective feedback signals from each other,
   wherein the plurality of wheel controllers are configured to transmit and receive the respective feedback signals from each other when it is not determined that the plurality of wheel controllers have received the braking command and the feedback signal from the center controller.

9. The method of controlling an electronic mechanical brake of claim 8, further comprising:

estimating a speed of a vehicle based on information about the speed of wheels shared between the plurality of wheel controllers after generating a braking force based on the first braking command; and controlling wheel slip based on the estimated speed of the vehicle.

10. The method of controlling an electronic mechanical brake of claim 8, wherein the generating a braking force based on the second braking command involves:

comparing a first deceleration value of a vehicle whose weight is a gross vehicle weight and a second deceleration value of the vehicle whose weight is a curb vehicle weight;

calculating a target wheel speed change rate based on a lower value of the first deceleration value and the second deceleration value;

determining whether a current wheel speed change rate of the vehicle has exceeded the target wheel speed change rate;

determining that wheel slip has occurred and issuing a braking force release command when it is determined that the current wheel speed change rate of the vehicle has exceeded the target wheel speed change rate; and generating a braking force apply command when the current wheel speed change rate is lower than or equal to the target wheel speed change rate after performing braking based on the braking force release command.

* * * * *